(12) United States Patent
Scholz

(10) Patent No.: US 7,681,868 B2
(45) Date of Patent: Mar. 23, 2010

(54) AIR SPRING HAVING A ROLL-OFF PISTON AND A ROLLING-LOBE FLEXIBLE MEMBER HAVING AT LEAST ONE ATTACHMENT PART VULCANIZED THEREON

(75) Inventor: Karsten Scholz, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 545 days.

(21) Appl. No.: 11/640,943

(22) Filed: Dec. 19, 2006

(65) Prior Publication Data

US 2007/0096374 A1    May 3, 2007

Related U.S. Application Data

(63) Continuation-in-part of application No. PCT/EP2005/052164, filed on May 12, 2005.

(30) Foreign Application Priority Data

Jun. 23, 2004 (DE) ........................ 10 2004 030 335

(51) Int. Cl.
F16F 9/04 (2006.01)
(52) U.S. Cl. .................. 267/64.27; 267/64.28
(58) Field of Classification Search .............. 267/64.19, 267/64.21, 64.23, 64.27, 64.28
See application file for complete search history.

(56) References Cited

U.S. PATENT DOCUMENTS 3,897,941 A * 8/1975 Hirtreiter et al. ......... 267/64.24
5,180,146 A * 1/1993 Schneider et al. ........ 267/64.27
5,286,010 A * 2/1994 Pahl et al. ................. 267/64.24
5,954,316 A * 9/1999 Voss ........................ 267/64.27
6,926,264 B1 * 8/2005 Trowbridge .............. 267/64.27

FOREIGN PATENT DOCUMENTS

| DE | 92 03 929 | 7/1992 |
|---|---|---|
| DE | 41 15 028 | 11/1992 |
| DE | 43 27 585 | 3/1995 |
| DE | 44 28 601 | 2/1996 |
| DE | 202 10 955 | 9/2002 |
| EP | 0 451 749 | 10/1991 |
| EP | 0 870 947 | 10/1998 |
| JP | 10299808 | 11/1998 |
| WO | WO 00/73676 | 12/2000 |

* cited by examiner

Primary Examiner—Bradley T King
(74) Attorney, Agent, or Firm—Walter Ottesen

(57) ABSTRACT

An air spring has a roll-off piston (1) and a rolling-lobe flexible member (2) of rubber or rubber-like material. At least the opening of the rolling-lobe flexible member, which lies opposite the opening assigned to the roll-off piston (1), is closed air tight with an attachment part (3) and the attachment part has a planar connecting region (4) having at least one air connection (7) and an outer rim (11) and a conical region (10) facing toward the rolling-lobe flexible member (2). The rolling-lobe flexible member (2) is tightly vulcanized to the attachment part (3) in a vulcanization region (12) which extends from the side (9) of the outer rim (11) into the conical region (10). The side (9) of the outer rim (11) faces toward the rolling-lobe flexible member (2). The at least one attachment part (3), which is vulcanized to the rolling-lobe flexible member (2), is configured as a head plate (3) complete with all connections (7) and is made of thermoplastic or duroplastic synthetic material.

4 Claims, 2 Drawing Sheets

AIR SPRING HAVING A ROLL-OFF PISTON AND A ROLLING-LOBE FLEXIBLE MEMBER HAVING AT LEAST ONE ATTACHMENT PART VULCANIZED THEREON

CROSS REFERENCE TO RELATED APPLICATIONS

This application is a continuation-in-part application of international patent application PCT/EP 2005/052164, filed May 12, 2005, and claiming priority from German application 10 2004 030 335.5, filed Jun. 23, 2004, and the entire content of both applications is incorporated herein by reference.

FIELD OF THE INVENTION

The invention relates to an air spring having a roll-off piston and a rolling-lobe flexible member of rubber or rubber-like material. At least the opening of the rolling-lobe flexible member, which lies opposite the opening assigned to the roll-off piston, is closed air tight with an attachment part and the attachment part has a planar connecting region with at least one air connection and an outer edge and a conical region facing toward the rolling-lobe flexible member. The rolling-lobe flexible member is tightly vulcanized to the attachment part in a vulcanization region extending from the side of the outer edge facing toward the rolling-lobe flexible member into the conical region.

The attachment part of the rolling-lobe flexible member has the task of tightly holding the rolling-lobe flexible member to a chassis of a motor vehicle, preferably, a truck. The attachment part must furthermore close off the rolling-lobe flexible member air tight. The opposite-lying end of the rolling-lobe flexible member is, for example, fixed air tight to a conical seat on the roll-off piston or the opposite-lying end of the rolling-lobe flexible member can have a second attachment part (for example, an attachment plate) which is vulcanized tightly to the rolling-lobe flexible member or can be fixed air tight to the piston at the rolling-lobe flexible member via tightening a screw or other attachment part.

The upper attachment part can, for example, be configured as a flanged plate which is mechanically coupled to the completely vulcanized rolling-lobe flexible member via a die flanging operation. As described initially herein, the attachment part can also be vulcanized tightly to the rolling-lobe flexible member as a conical plate.

BACKGROUND OF THE INVENTION

German patent publication 43 27 585 describes an air spring whose rolling-lobe flexible member is attached with a sealing bead to a conical sealing seat of an attachment part. No details are provided as to the type of attachment. Air springs of this kind are in use in a multiplicity of embodiments. The solution of the attachment of the rolling-lobe flexible member to an attachment part, which is shown in German patent publication 43 27 585, can be considered as a typical embodiment. The attachment part is essentially configured as a conical plate and has an air connection which often also functions simultaneously as an attachment element. Versions having several air connections and additional connections are possible. In addition to the connections, the conical plates comprise primarily two pieces of sheet metal welded to each other, namely, a round disc and a conical ring. The conical ring is in most instances only spot welded and not continuously welded to the round disc for simplification and to avoid warpage of the round disc. When the rolling-lobe flexible member is vulcanized to the attachment part, the vulcanization region must be coated with a bonding agent in a separate work step in advance of the vulcanization. One conical plate is then placed in the opening of the rolling-lobe flexible member blank in the manufacturing process. The opening lies opposite to the opening assigned to the rolling-lobe flexible member and the rolling-lobe flexible member is vulcanized to the conical plate in the vulcanization press.

This type of attachment has the following disadvantages:

a complex welding process is required for the air connection and the additional connections;

an unwanted gap can occur between the conically-shaped ring and the round disc when spot welding. The rubber can flow through this gap into the interior of the flexible member during the vulcanization process;

a tightness control is needed in order to check the quality of the weld seams at the connections; and, the conical plate must be protected against corrosion.

The air connections are furthermore configured as pivot parts and are therefore cost intensive.

SUMMARY OF THE INVENTION

It is an object of the invention to provide an air spring of the above-described type wherein the rolling-lobe flexible member has at least one attachment part vulcanized thereto. This attachment part is produced without complex welding operations and exhibits no gap and no tightness control is required therefor.

The object of the invention is achieved in that the at least one attachment part, which is vulcanized to the rolling-lobe flexible member, is configured as a head plate complete with all connections and is made of thermoplastic or thermoset plastic.

The embodiment affords the advantage that the head plate can be produced in one work step, preferably, a plastic injection molding operation without welding. In this way, the tightness control becomes unnecessary. An additional corrosion protection is not required.

In a further embodiment of the invention, the head plate includes reinforcement inserts of metal in its interior.

These reinforcement inserts can advantageously increase the strength of the head plate against bursting or deformation.

In a further embodiment of the invention, a bonding agent is applied in the vulcanization region of the head plate as a thermoplastic material which can be introduced as a second component directly during the manufacturing process of the head plate.

This affords the advantage that a subsequent cost-intensive coating of the head plate with a bonding agent is not necessary.

An attachment part of this kind according to the invention can be easily manufactured and is cost effective because welding operations are completely unnecessary and plastic is a light and corrosion resistant material which is easy to work with. Complex subsequent manipulations such as coating or tightness controls can be avoided. The risk of vulcanization errors is significantly decreased because the head plate no longer has any gaps.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
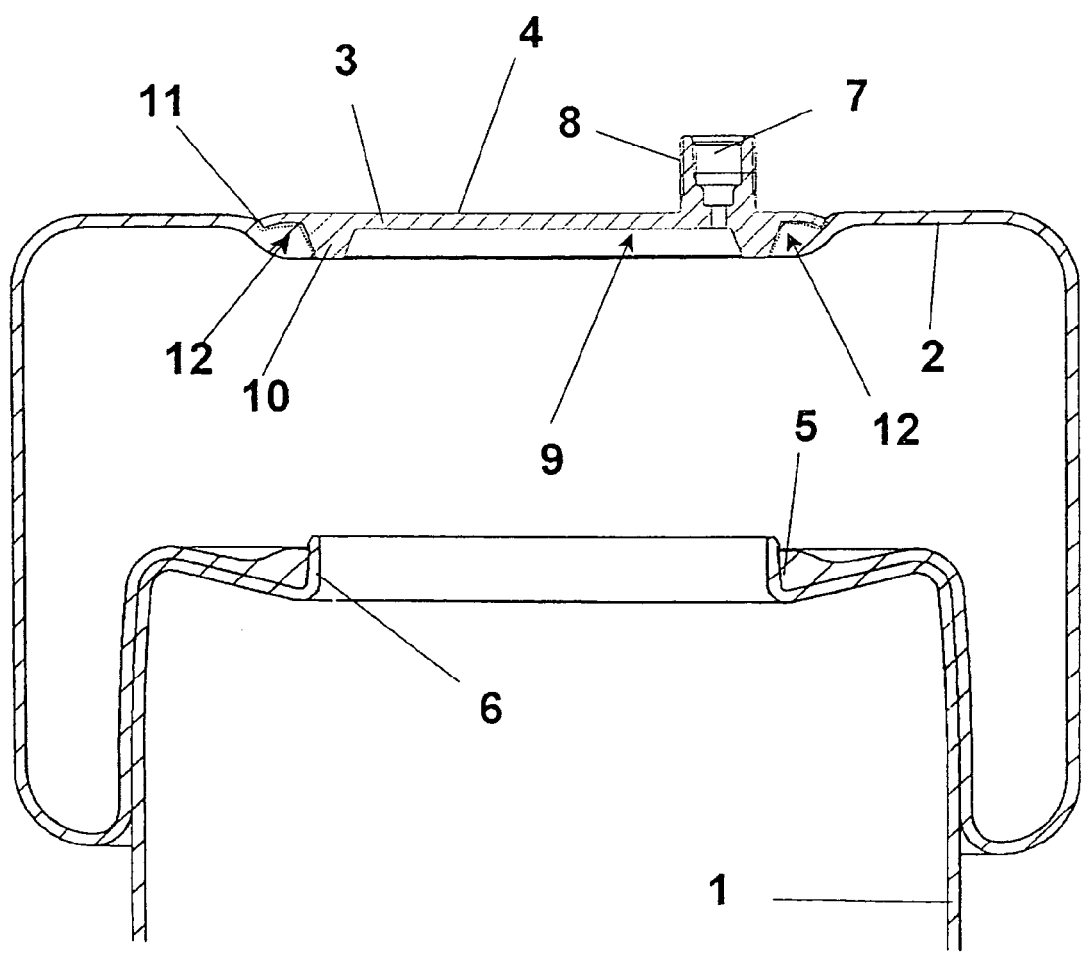
FIG. 1 is a section view of an air spring.

FIG. 1 shows an air spring having a roll-off piston 1, a rolling-lobe flexible member 2 of elastomeric material and a head plate 3 of thermoplastic synthetic material.

The rolling-lobe flexible member 2 is attached air tight to a connecting cone 6 of the roll-off piston 1 by means of a conical seat 5.

The head plate 3 includes an air connection 7. A thread 8 is arranged on the air connection 7 at the exterior thereof. The air spring can be attached to a chassis (not shown) of a motor vehicle using the external thread 8.

A ring 10 is arranged on the lower side 9 of the head plate 3 and is spaced from the outer rim 11 of the head plate 3. This ring 10 has a conically-shaped cross section.

The rolling-lobe flexible member 2 is vulcanized tightly and air tight to the head plate 3 in a vulcanization region 12 on the lower side 9 of the head plate 3 at the outer surface of the conical ring 10.

The head plate 3 including air connection 7 and conical ring 10 is made of thermoplastic synthetic material such as PA 6.6 GF in a plastic injection molding operation. A bonding agent (not shown) can be simultaneously applied in the vulcanization region 12 as a second component.

Figure 2:
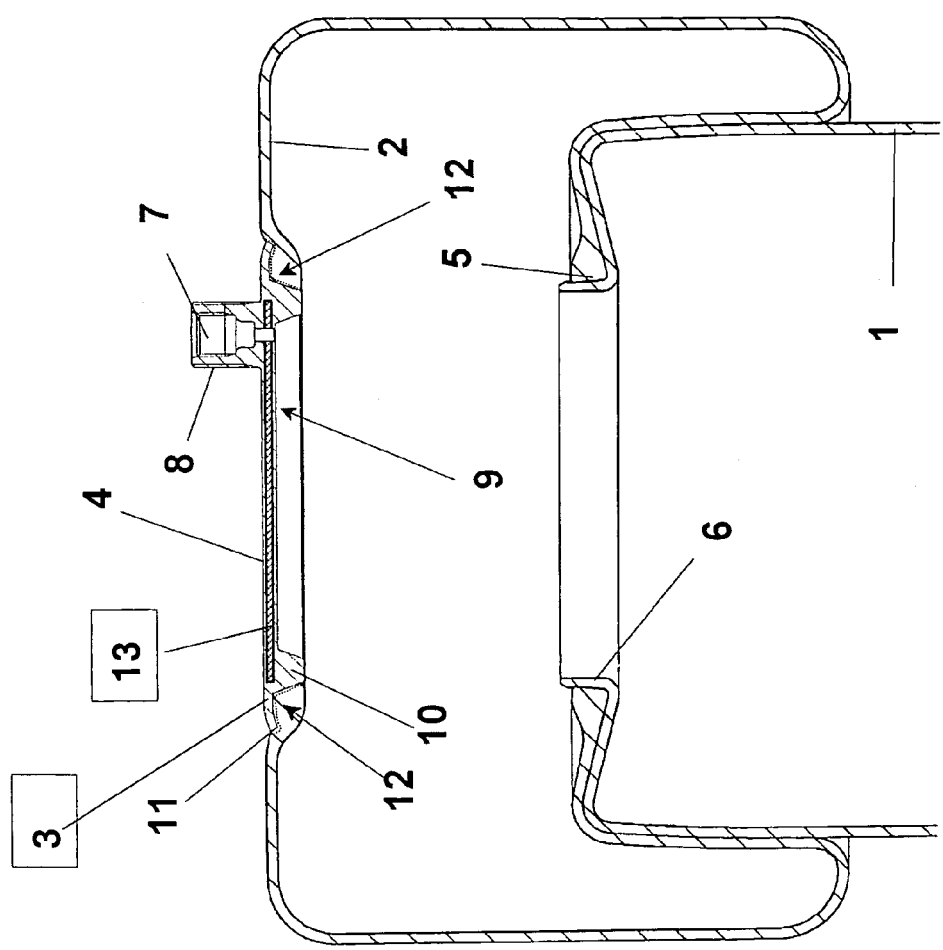
FIG. 2 shows the air spring of FIG. 1 having a metal reinforcement in the head plate.

FIG. 2 shows the arrangement of FIG. 1 having a head plate 3 wherein the head plate 3 has a reinforcement insert 13 in the form of a metal plate.

It is understood that the foregoing description is that of the preferred embodiments of the invention and that various changes and modifications may be made thereto without departing from the spirit and scope of the invention as defined in the appended claims.

What is claimed is:

1. An air spring comprising:
a roll-off piston;
a rolling-lobe flexible member made of rubber or elastomeric material;
said rolling-lobe flexible member having a first opening lying opposite said roll-off piston and a second opening assigned to said roll-off piston;
an attachment part configured as a head plate;
said attachment part being made of thermoplastic or thermoset plastic and having air connection means formed integrally therewith;
said attachment part having an outer rim and a conical region also formed integrally therewith;
said outer rim and conical region facing toward said rolling-lobe flexible member;
said attachment part defining a vulcanization region extending from the side of said rim facing toward said rolling-lobe flexible member into said conical region; and,
said rolling-lobe flexible member being tightly vulcanized to said attachment part in said vulcanization region at said first opening while said rolling-lobe flexible member is seated in said vulcanization region.

2. The air spring of claim 1, wherein said head plate includes an internal reinforcement insert made of metal.

3. The air spring of claim 1, further comprising a bonding agent disposed in said vulcanization region and configured as a thermoplastic material which can be introduced as a second component when making said head plate.

4. The air spring of claim 1, wherein said attachment part has a planar connecting region.

\* \* \* \* \*